United States Patent [19]

Potter, Jr.

[11] Patent Number: 5,065,540
[45] Date of Patent: Nov. 19, 1991

[54] STRIKING ROD HOLDER

[76] Inventor: William S. Potter, Jr., 4235 Douglas Rd., Coconut Grove, Fla. 33133

[21] Appl. No.: 606,114

[22] Filed: Oct. 31, 1990

[51] Int. Cl.⁵ ............................................ A01K 97/10
[52] U.S. Cl. ...................................... 43/21.2; 43/19.2; 248/520; 248/538; 248/314; 114/364
[58] Field of Search ............... 43/21.2, 19.2; 248/511, 248/512, 513, 514, 515, 314, 316.5, 520, 538; 114/364, 343, 218

[56] References Cited

U.S. PATENT DOCUMENTS

| | | | |
|---|---|---|---|
| 602,662 | 4/1898 | Miller | 248/316.5 |
| 1,406,571 | 2/1922 | McCoy | 248/511 |
| 1,883,508 | 10/1932 | Bonday | 248/314 |
| 2,003,535 | 6/1935 | Haskin | 248/538 |
| 2,312,957 | 3/1943 | Cannon, Jr. | 248/42 |
| 3,126,180 | 3/1964 | Mandolare | 248/41 |
| 3,156,366 | 12/1964 | Knight | 43/21.2 |
| 3,273,846 | 9/1966 | DeMare | 248/514 |
| 3,902,269 | 9/1975 | Dunlap | 43/21.2 |
| 3,964,706 | 6/1976 | Adams | 43/21.2 |
| 4,017,998 | 4/1977 | Dumler | 43/21.2 |
| 4,062,299 | 12/1977 | Smith | 114/364 |
| 4,375,731 | 3/1983 | Budd | 43/21.2 |
| 4,528,768 | 7/1985 | Anderson | 43/21.2 |
| 4,578,891 | 4/1986 | Murray | 43/21.2 |
| 4,676,019 | 6/1987 | Engles | 248/520 |
| 4,793,086 | 12/1988 | Cup | 43/21.2 |

Primary Examiner—Richard K. Seidel
Assistant Examiner—Jeanne M. Elpel
Attorney, Agent, or Firm—Webb, Burden, Ziesenheim & Webb

[57] ABSTRACT

Disclosed is a striking rod holder for mounting to a boat, fishing chair or rocket launcher. The striking rod holder includes a first plate, a rod holding tube attached to the first plate, and a second plate for attaching to a surface, where the first plate pivotally attaches to the second plate. A cushion material may be positioned between the first plate and the second plate. A locking device can further be included with the striking rod holder to maintain the tube in a fixed position. Also disclosed is a method to convert a non-tilting rod holder or a flush-mounted fixed striking rod holder into a tilting rod holder.

32 Claims, 5 Drawing Sheets

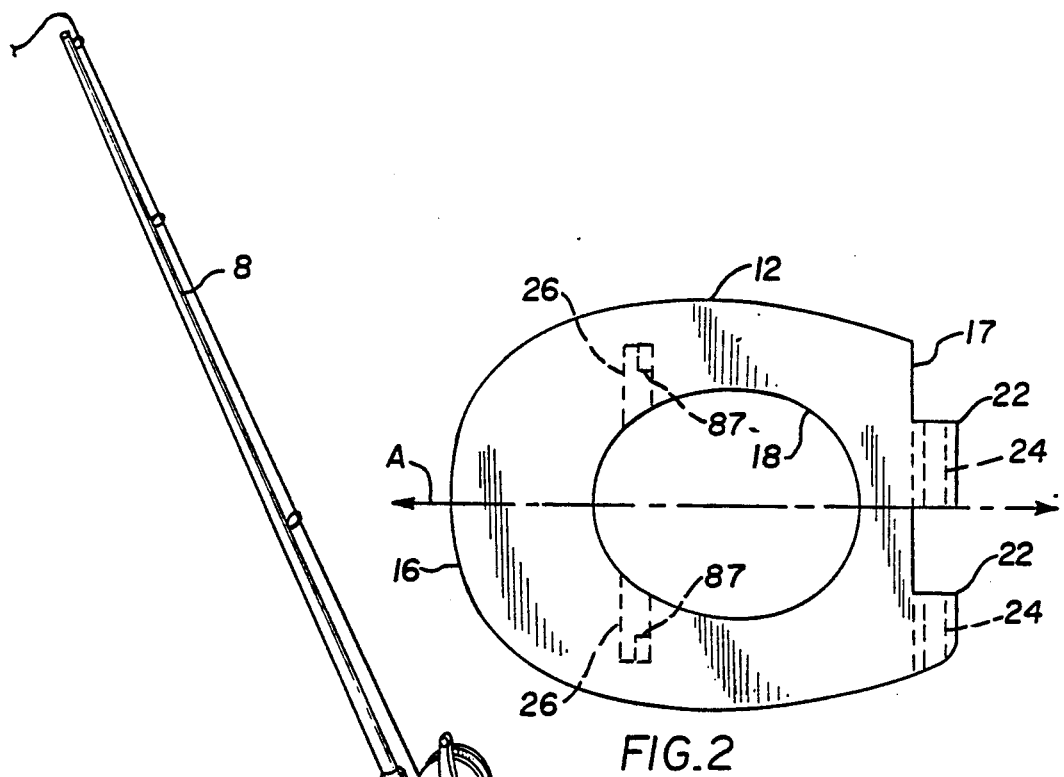
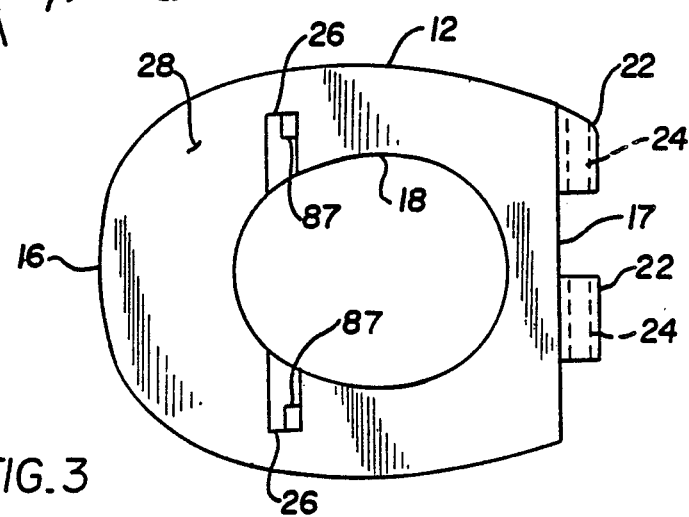
PRIOR ART
FIG. 1
FIG. 2
FIG. 3

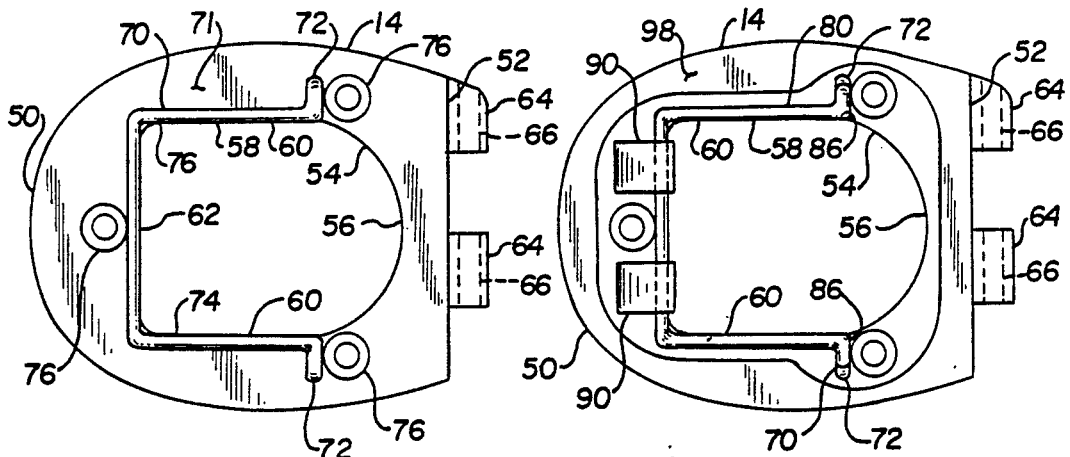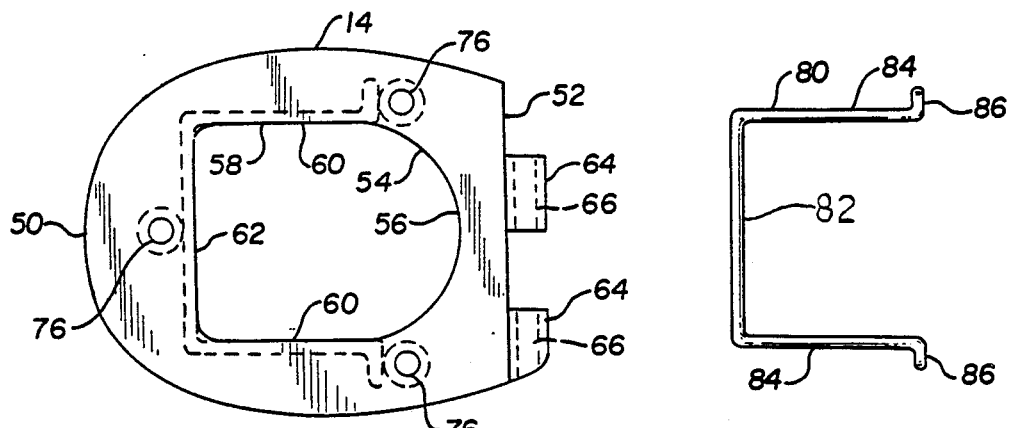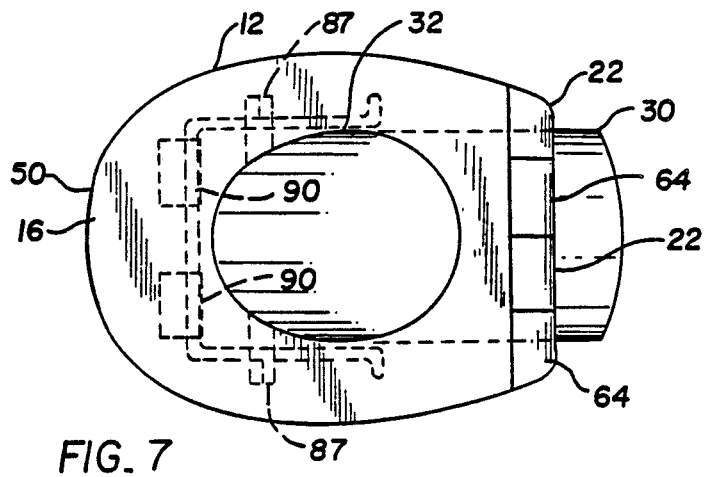

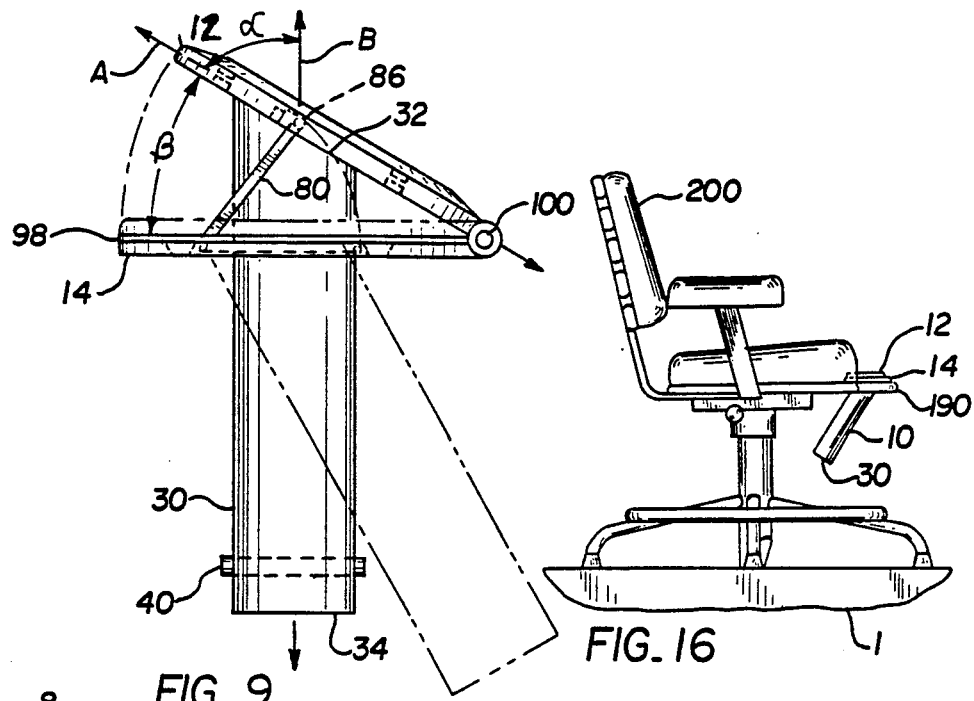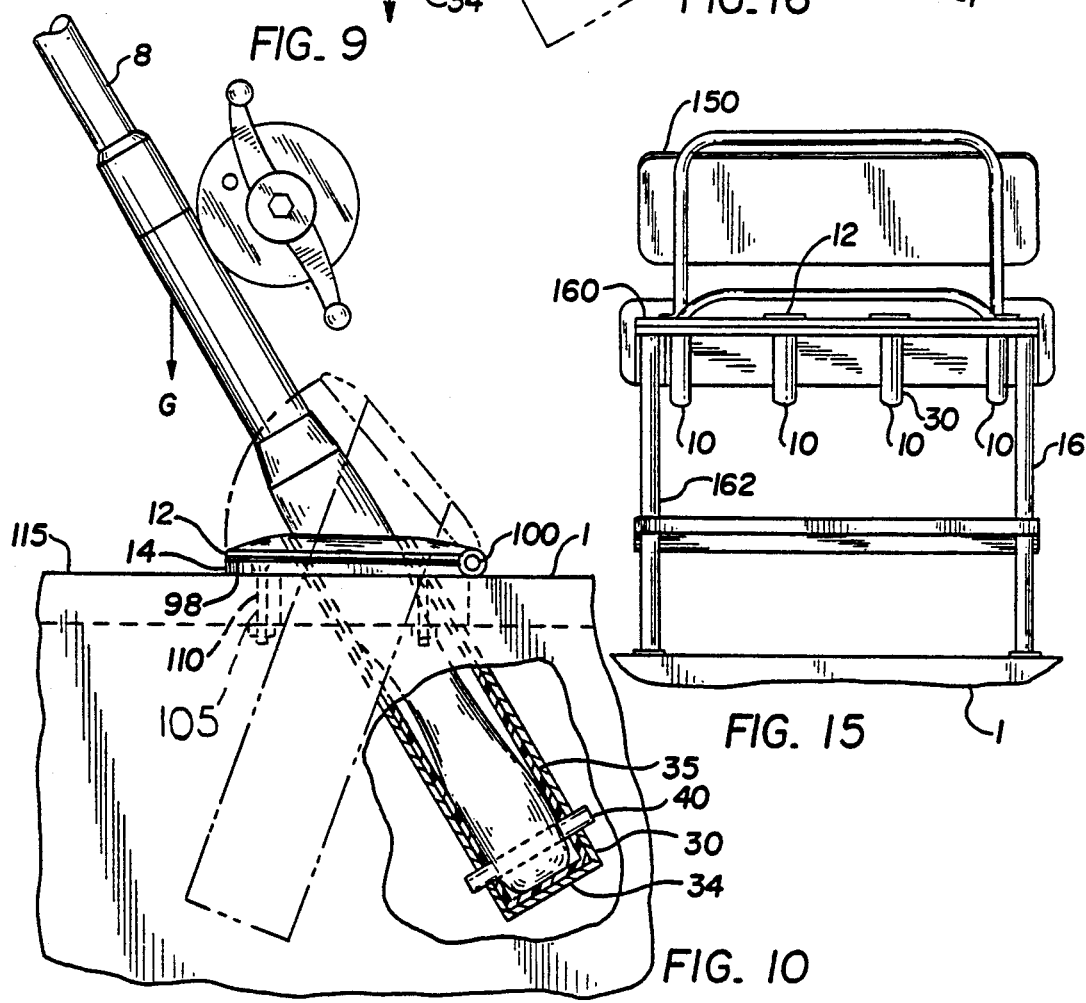

STRIKING ROD HOLDER

FIELD OF THE INVENTION

This invention relates to a fishing rod holder and, more particularly, to a fishing striking rod holder for use in fishing from boats.

DESCRIPTION OF THE PRIOR ART

In the past few years, deep sea fishing has become extremely popular with amateur sports fishermen. Typically, these fishermen use the "trolling" method to attract and catch fish. Most fishing boats utilizing the trolling method have various types of fixed fishing rod holders positioned around the gunwales, the cover boards, or the top decks to hold the rods at angles of approximately 25°–35° of vertical.

The most popular type of rod holders, particularly on larger, offshore boats 1 (i.e. deep sea or large lake) are "flush-mounted rod holders" 5, as shown in FIG. 1. These non-moveable or non-tilting holders include a top mounting plate 6 having fastener receiving holes so that the mounting plate 6 can be mounted by bolts or screws to a surface. A rod holding tube 7 directly and firmly attaches to the mounting plate 6 and projects downward below the mounting plate 6 and the surface.

Rods 8 used with the rod holders are rigged with various kinds of bait and lures and placed in the rod holders trailing their lines behind the boats so that multiple lines can be utilized and kept separated without being hand-held. Trolling speeds can vary from just barely moving to as high as 20 knots or more for certain large ocean fish. Thus, the rod holders need to be strong and firmly attached to the boat.

It is often desirable to "jig" the lures or dead bait by moving the rod tip forward in one or more jerking motions creating the illusion of an alarmed or injured bait, and sometimes just to clear the baits of attached weeds. This cannot be done with a rod installed in a non-tilting rod holder. Hence, the rod must be removed, actuated by the fisherman, and returned to its holder.

Similarly, when the lure or bait is struck by an attacking fish, it is desirable to set the hook by smoothly and firmly moving the rod tip forward at the proper time. Again, this cannot be done with the rod installed in a fixed rod holder. Like the above case, the rod must first be removed from the fixed rod holder before any hook setting motion can be imparted to the rod. Often the motion transmitted to the bait in the act of excitedly grabbing the rod and removing it from its holder is enough to scare off the attacker or even pull the bait from its mouth before the proper hook setting motion can be used.

Striking rod holders which allow the rod to move relative to the trolling position while remaining in its holder have long been known to be highly desirable. Although the most expensive fighting chairs feature this type of striking rod holder, similarly configured deck or flush-mounted rod holders have never been acceptable to fishermen due to their space requirements and high costs. Such rod holders are illustrated in U.S. Pat. Nos. 2,312,957; 3,126,180; 3,902,269; 4,017,998; 4,375,731; 4,578,891 and 4,778,141.

It is an object of my invention to provide a strong, compact, low-profile, flush-mounted rod holder capable of allowing a hand-held rod to be tilted from the trolling position through a sufficient arc to set the hook in, i.e., strike, a fish without removing the rod from the holder.

It is a further object of my invention to provide retrofitable adaptors that can convert existing flush-mounted fixed rod holders into moveable rod holders.

SUMMARY OF THE INVENTION

My invention is a striking rod holder having a first member, a rod holding tube attached to the first member and a second member for attaching to a surface. The first member pivotally attaches to the second member. The first member can be hinged to the second member. The first member can include a passageway through which the rod holding tube passes. Likewise, the second member can include a passageway through which the rod holding tube passes. The passageways can be holes. The first member and the second member can be plates. A cushion can be attached to the second member and positioned between the first member and the second member, so that when the striking rod holder is in a closed position, the cushion is sandwiched between the first member and the second member. This cushion can be made of rubber, such as neoprene rubber.

The striking rod holder can further include a device for maintaining the first member in a fixed position relative to the second member. This device can include a bracket pivotally mounted to the second member and having a pin depending therefrom and a pin receiving recess located in the first member, whereby when the first member is positioned to the fixed position, the bracket is pivoted so that the pin engages with the pin receiving recess. The bracket can be U-shaped having a base and two depending legs with the base pivotally attached to the second member and each leg having a pin depending therefrom. The rod holding tube can be positioned between the legs of the U-shaped bracket.

The striking rod holder can be mounted to a chair; or the second member can be mounted directly to a boat, or to a base having legs mounted thereto wherein the legs can be mounted to a boat.

Another embodiment of the invention is a striking rod holder or non-tilting striking rod holder adaptor for converting a flush-mounted fixed rod holder having a mounting plate and a rod-holding tube attached thereto into a tilting rod holder. The adaptor includes a first member for attaching to the non-tilting rod holder and a second member for attaching to a surface, the first member pivotally attached to the second member. The first member and second member can have respective passageways through which the rod-holding tube can pass. Further, a cushion can be attached to the second member positioned between the first member and the second member, whereby when the striking rod holder adaptor is in a closed position, the cushion is sandwiched between the first member and the second member. The striking rod holder adaptor can include means for maintaining the first member in a fixed position relative to the second member. When the non-tilting rod holder mounting plate has fastener receiving holes, the first member can include holes coaxial with and corresponding to the fastener receiving holes of the non-tilting rod holder mounting plate which are adapted to receive fasteners passing through the holes in the mounting plate for attaching the mounting plate to the first member.

Another embodiment of the invention is a method for converting a non-tilting striking rod holder having a mounting plate mounted to a surface and a rod holding tube attached to the plate into a tilting rod holder having the steps of: (a) removing the non-tilting striking rod holder from the surface; (b) attaching the mounting plate to a first member of a striking rod holder adaptor, the striking rod holder adaptor further including a second member for attaching to a surface, the first member pivotally attached to the second member; and (c) attaching the second member to the surface.

DESCRIPTION OF THE DRAWINGS

FIG. 1 is a perspective top view of a portion of a boat having a prior art flush-mounted rod holder attached thereto;

FIG. 2 shows a top view of an upper hinge plate of a striking rod holder made in accordance with the present invention;

FIG. 3 is a bottom view of the upper hinge plate shown in FIG. 2;

FIG. 4 is a top view of a lower hinge plate of the striking rod holder made in accordance with the present invention;

FIG. 5 is a bottom view of the lower hinge plate shown in FIG. 4;

FIG. 6 is a U-shaped bracket;

FIG. 7 is a top view of the striking rod holder made in accordance with the present invention;

FIG. 8 is a top view of the U-shaped bracket mounted to the lower hinge;

FIG. 9 is a side view showing the striking rod holder adaptor plate with the attached flush-mounted rod FIG. 10 is a side view partially in section of the striking rod holder mounted to a boat;

FIG. 15 shows the striking rod holder of the present invention mounted to a "rocket launcher"; and FIG. 16 shows the striking rod holder mounted to a chair.

DESCRIPTION OF THE PREFERRED EMBODIMENTS

Figure 11:
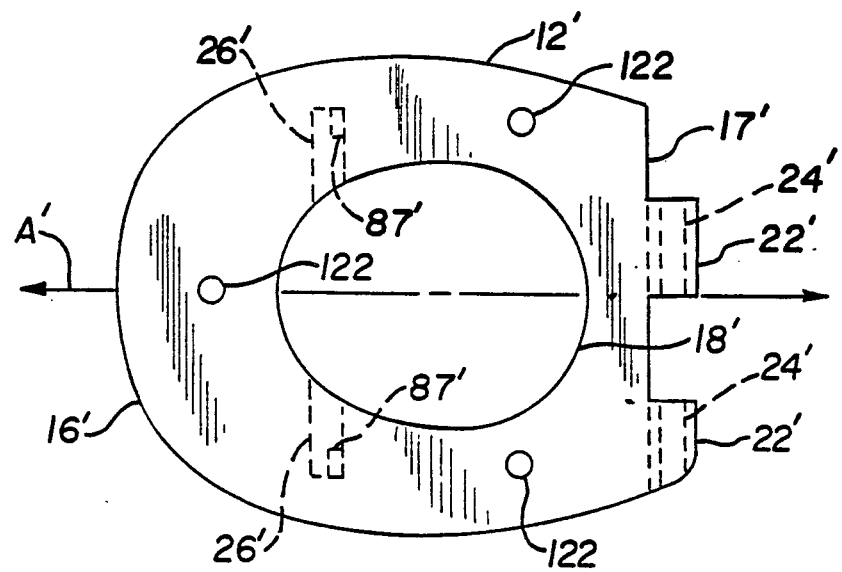
FIG. 11 shows a top view of an upper hinge plate of a striking rod holder adaptor made in accordance with the present invention.

My invention is a tilting striking rod holder 10 generally shown in FIGS. 2-10 and includes a first member or an upper hinge plate 12 and a second member or lower hinge plate 14. As shown in FIGS. 2 and 3, the upper hinge plate 12 is substantially flat and has an arcuate shaped rearward edge 16 and a flat forward edge 17. The upper hinged plate 12 includes a central oblong hole or passageway 18 symmetric about an axis A. Two spaced apart fingers 22 extend from the forward edge 17 of the upper hinge plate 12. Respective bore holes 24 pass through fingers 22. Two recesses 26, spaced apart by the hole 18 and located near the rearward end of the hole 18, are positioned on a lower surface 28 of the upper hinge plate 12.

A cylindrically shaped rod holder tube 30, passes through hole 18, FIGS. 7, 9 and 10. The tube 30 is coaxial with an axis B which intersects axis A. The tube 30 fixedly mounts to the upper hinge plate 12, for example, by welding or brazing. Alternatively, the upper hinge plate 12 can be integrally formed with the tube 30. This combination can be molded from plastic or metal. The tube 30 has an open upper end 32 positioned near hole 18 and a closed bottom end 34. The tube 30 may instead have an open end 34. The upper end 32 is positioned above the lower hinge plate 14 and the bottom end 34 is positioned below the lower hinge plate 14. A rubber liner or soft plastic liner 35 can be provided within the tube 30. Preferably, rod holder tube 30 is angularly positioned with respect to the upper hinge plate 12. Specifically, the angle $\alpha$ formed between axis A and axis B is typically between 25°-35°.

A pin 40, oriented perpendicular to axis B passes through tube 30. The rod butt has a pin engaging slot which engages with pin 40. This arrangement, which is known in the art, prevents the rod 8 from rotating in the tube 30.

As shown in FIGS. 4 and 5, the lower hinge plate 14 is substantially flat and has an arcuate shaped rearward edge 50, a flat forward edge 52 and a central hole, or passageway, 54. Two spaced apart fingers 64 extend from the forward edge 52 of the lower hinge plate 14. Respective bore holes 66 pass through fingers 64. Hole 54 is larger than hole 18 and includes an arcuate forward edge 56 and a three-sided U-shaped rearward edge 58. The rearward edge includes two legs 60 and a base 62. A substantially U-shaped groove 70 is formed about the perimeter of the rearward edge 58 of hole 54 on an upper surface 71 of the lower hinge plate 14. Outwardly extending grooves 72 are positioned at upper ends of respective legs 74 of the U-shaped groove 70. Three countersunk holes 76 are provided about the periphery of hole 54 and are adapted to receive fasteners for mounting the lower hinge plate 14 to a surface.

As shown in FIGS. 6-8, a U-shaped bracket 80 having a base 82, two depending legs 84 attached to base 82, and two outwardly depending pins 86, each attached to a respective leg 84 is received by the U-shaped groove 70. The bracket 80 can be formed from metal rod. Two hinge clips 90 are positioned over the base 82 of the U-shaped bracket 80. The clips 90 fixedly attach to the upper surface 71 of the lower hinge plate 14. In this manner, the bracket 80 can rotate about the hinge clips 90.

As shown in FIG. 8, adjacent fingers 22 of the upper hinge plate 12 align with fingers 64 of the bottom hinge plate 14 so that a cylindrical hinge pin 100 can pass through the respective bore holes 24, 66 pivotally attaching the upper hinge plate 12 to the bottom hinge plate 14. Specifically, the pin 100 is slideably received by bore holes 24 and fixedly received, by interference fit, by bore holes 66. In this arrangement, the rod holding tube 30 passes through hole 54 of the lower hinge plate 14. The upper hinge plate 12 is angularly moveable about pin 100 relative to the lower hinge plate 14 between a closed, or first, position and a second position, as shown in FIG. 10. The striking rod holder 10 in the closed position gives the appearance of the flush-mounted rod holder 5.

As shown in FIG. 9, when the angular distance between the upper hinge plate 12 and the lower hinge plate 14 is an angle beta, which is between the closed position and the second position, the bracket 80 may be rotated so that pins 86 are received by respective pin recesses 26 in slots 87 on the bottom surface of upper hinge plate 12. This maintains a fixed relative position of the upper hinge plate 12 and lower hinge plate 14. Typically, this fixed position is such that the rod holding tube 30 is positioned perpendicular to the lower hinge plate 14. The top hinge plate 12 need only be rotated away from the bottom hinge plate 14 and the bracket 80 placed in groove 70 to permit rotation of the upper hinge plate 12. It is contemplated that any type of arrangement can be used to fix the position of the upper hinge plate and lower hinge plate.

As shown in FIG. 8, a neoprene rubber cushion 98 attaches to the upper surface 71 of the lower hinge plate 14. The cushion 98 includes a hole coaxial with and larger than hole 54 of the lower hinge plate 14. The cushion 98, which can be any shock absorbing material such as neoprene rubber, serves to absorb shock. Also, the cushion 98 minimizes noises when the two plates 12, 14 come in contact in the closed, normal trolling position. This shock absorbing feature combined with the protection afforded the rod butt by the rubber or soft plastic liner 35 of the tube 30 gives the rod butt maximum protection from abrasion and sudden abrupt movement of loads.

Bore holes 76 in the lower hinge plate 14 can be made such that they align with the presently drilled holes 105 where the non-moveable flush-mounted rod holders 5 are in place. Therefore, one can easily replace the fixed rod holders by removing fasteners 110 of the present units, remove the rod holder 5, replace it with the striking rod holder 10 and then fasten the lower hinged plate 14 to the holding surface by fasteners 110 passing through bore holes 76, 105. Thus, generally speaking, no additional changes need be made to the holding surface 115, i.e., drilling holes, on the boat 1 to replace the flush-mounted rod holder 5 with the striking rod holder 10. However, at times, the deck clearance hole of the boat mounting surface 115 may need to be slightly enlarged to provide adequate swing clearance for the rod holding tube 30.

Due to the center of gravity G of fishing rods, the striking rod holder 10 when holding the rod 8 tends to remain in the trolling position, as shown in FIG. 10, and does not require a locking device to keep the rod 8 from swinging. This overcomes the swinging disadvantage of the lower pivot type striking rod holders as illustrated in U.S. Pat. Nos. 4,778,141; 4,578,891 and 4,375,731.

Figure 12:
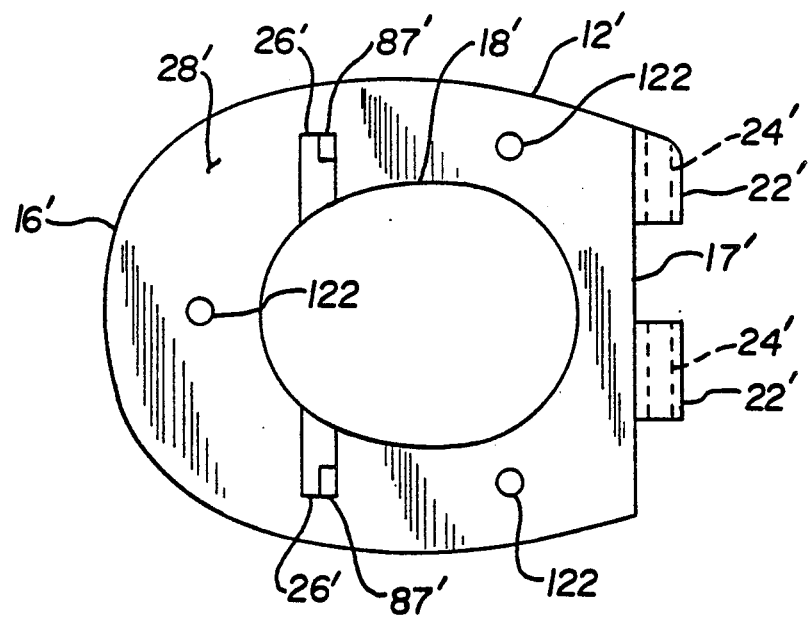
FIG. 12 shows a bottom view of the upper hinge plate of FIG. 11.
Figure 13:
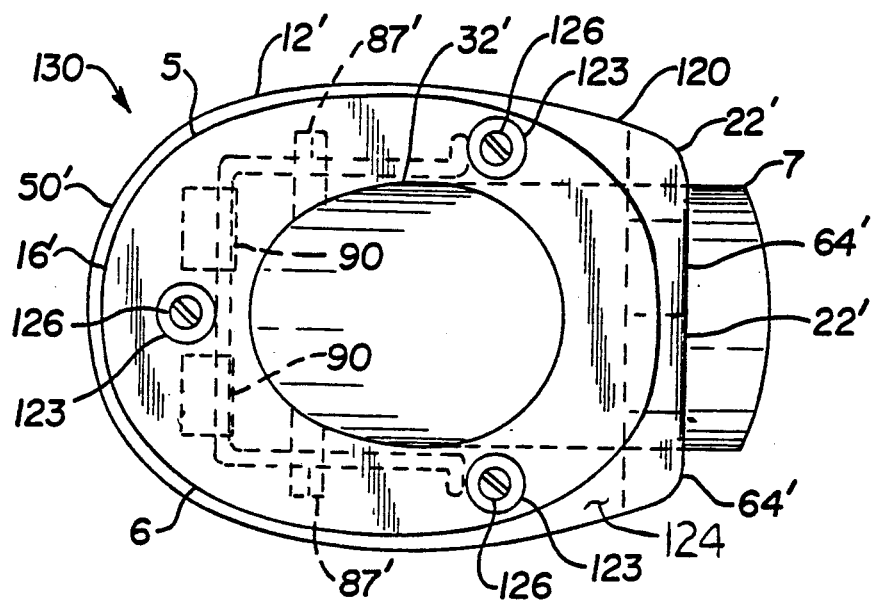
FIG. 13 is a top view of an assembled flush-mounted rod holder attached to the striking rod holder adaptor.
Figure 14:
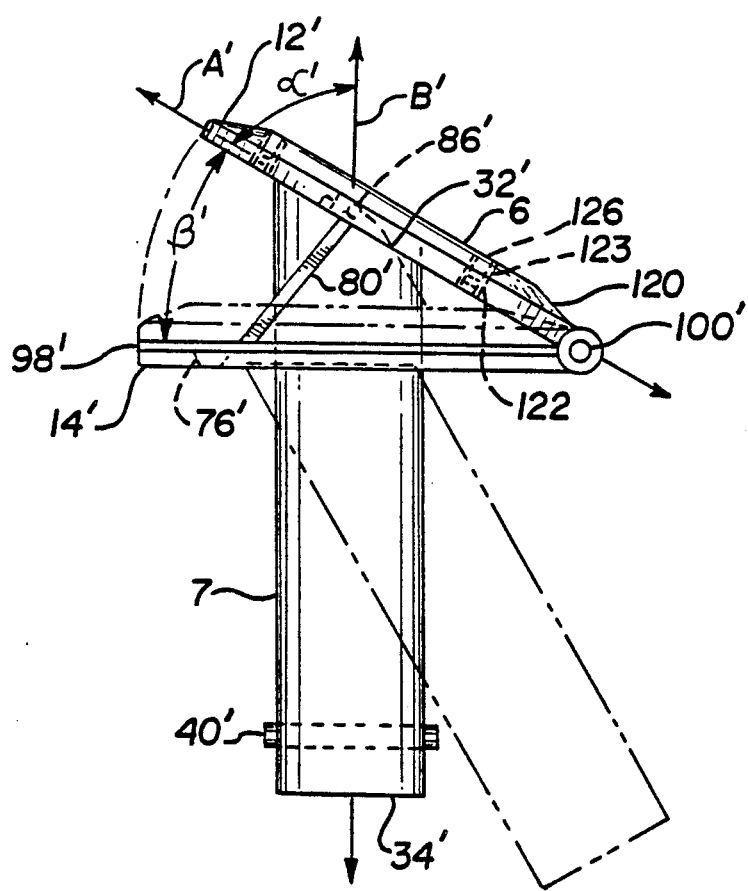
FIG. 14 is a side view showing the striking rod holder in a locked position.

FIGS. 11–14 show a second embodiment of my invention, a striking rod holder adaptor 120. The striking rod holder adaptor 120 is similar to the striking rod holder 10 with the exception of the elimination of the tube 30 and modifications to the upper hinge plate 12. Accordingly, like primed reference numerals are used for like elements.

Upper hinge plate 12' is similar to hinge plate 12 and further includes three threaded holes 122 around the central hole 18'. The three holes are coaxial with and correspond to the three fastener receiving holes 123 of the top mounting plate 6 of the flush-mounted rod holder 5.

The rod holder 5 rests on an upper surface 124 of upper hinge plate 12' so that holes 122 are coaxial with the fastener receiving holes 123 of the top mounting plate 6. The rod holding tube 7 passes through holes 18' and 54' of the lower hinge plate 14'. Appropriate fasteners 126 pass through holes 122 and the fastener receiving holes 123 of the top mounting plate 6, thereby attaching the top mounting plate 6 to the upper hinge plate 12' and forming a tilting striking rod holder 130. Of course, the top mounting plate 6 can be attached to the upper hinge plate 12' in any manner and need not be limited to fasteners. The striking rod assembly mounts to the boat by passing fasteners 110 through the holes 76' of the bottom plate 14' in the same manner as striking rod holder 10.

The striking rod holder adaptor 120 can easily and inexpensively convert a presently installed non-tilting flush-mounted fishing rod holder or a flush-mounted fixed striking rod holder 5 into a tilting flush-mounted striking rod holder 130 by first, removing the rod holder 5 from the boat surface 115; second, attaching the mounting plate 6 to the upper hinge plate 12' and attaching the lower hinge plate 14' to the boat surface 115 by the fasteners 110.

As shown in FIG. 15, the striking rod holder 10 can also be mounted on a so-called "rocket launcher" 150, a device which mounts several (3–5 typically) rod holders. The rocket launcher 150 includes a transverse surface or base 160 and four legs 162 attached thereto that are typically mounted to the boat 1. The rocket launcher 150 need not be limited to four legs, but can have any number of legs, i.e., one or more legs. One or more of the fishing rod holders 10 are mounted to the base 160 in a similar manner as that described previously. Because the rods do not have to be removed from the rod holders utilizing the present design, they can be used to jig the bait; to set the hooks; and to fight the fish without removing the rod from its holder 10. By standing in front of the rocket launcher 150 and leaving the rod in its holder 10, considerable added force can be applied while utilizing the traditional fore and aft pumping motion to assist reeling in the fish. The perpendicular locked position of the striking rod holder 10 is most useful in rocket launchers 150 where it is desirable to store the rods vertically in order to prevent obstruction of people moving around in the cockpit, or to keep the rods from projecting from the sides or the stern of the boat. It also allows easier access to line coming out of the tip of the rod for rigging when the striking rod holders are transom cover board mounted or near transom mounted on side cover boards.

As shown in FIG. 16, the striking rod holder 10 can also be used in place of a typical gimbal used on fishing chairs whereby the lower hinge plate 14 mounts to a support structure 190 on a fighting chair 200. The chair 200 can then be mounted to the boat 1.

The present striking rod holder 10 provides a significant safety and sporting advantage for young anglers and those simply not strong enough to safely remove the rod from a stationary holder with a large or strong fish on the line, and then stand and fight the fish while holding the rod or attempt to move to a seat or fighting chair. This is particularly true of rods and striking rod holders on the "rocket launcher" type mounting structures. Further, the striking rod holder 10 has few parts and can be easily and inexpensively manufactured.

Having described the presently preferred embodiments of my invention, it is to be understood that it may otherwise be embodied within the scope of the appended claims.

I claim:

1. A striking rod holder comprising:
   a first member;
   a rod holding tube attached to said first member; and
   a second member for attaching to a surface, at least one of said first member and said second member having a passageway through which said rod holding tube passes, and said first member pivotally attached to said second member.

2. The striking rod holder of claim 1 wherein said first member has a passageway through which said rod holding tube passes.

3. The striking rod holder of claim 1 wherein said second member includes a passageway through which said rod holding tube passes.

4. The striking rod holder of claim 1 wherein said first member and said second member have respective holes through which said rod holding tube passes.

5. The striking rod holder of claim 1 further comprising a cushion attached to said second member and positioned between said first member and said second member, whereby when said striking rod is in a closed position, said cushion is sandwiched between said first member and said second member.

6. The striking rod holder of claim 5 wherein said cushion is made of rubber.

7. The striking rod holder of claim 6 wherein said rubber is neoprene rubber.

8. The striking rod holder of claim 1 further comprising means for maintaining said first member in a fixed position relative to said second member.

9. The striking rod holder of claim 8 wherein said means for maintaining said first member in a fixed position relative to said second member comprises a bracket pivotally mounted to said second member and having a pin depending therefrom, and said first member having a pin receiving recess whereby when said first member is positioned to the fixed position, said bracket is pivoted so that said pin is engageable with said pin receiving recess.

10. The striking rod holder of claim 8 wherein said means for maintaining said first member in a fixed position relative to said second member comprises a U-shaped bracket having a base and two depending legs with said base pivotally attached to said second member and each leg having a pin depending therefrom, said rod holding tube positioned between said legs and said first member having two pin receiving recesses whereby when said first member is positioned to the fixed position, said bracket is pivoted so that said pins are engageable with respective pin receiving recesses.

11. The striking rod holder of claim 1 wherein said first member is hinged to said second member.

12. The striking rod holder of claim 1 wherein said second member mounts to a chair.

13. The striking rod holder of claim 12 wherein said chair fixedly mounts to a boat.

14. The striking rod holder of claim 1 wherein said second member fixedly mounts to a boat.

15. The striking rod holder of claim 1 further comprising a base and one or more legs mounted to said base with said second member fixedly mounted to said base.

16. The striking rod holder of claim 15 wherein said legs mount to a boat.

17. The striking rod holder of claim 1 further comprising a fixed mounting plate attached to said first member wherein said rod holding tube directly attaches to said fixed mounting plate.

18. The striking rod holder of claim 17 wherein said fixed mounting plate is attached to said first member by fasteners.

19. A striking rod holder comprising:
a first plate having a hole therein;
a rod holding tube attached to said first plate and passing through said first plate hole; and
a second plate having a passageway therein, said first plate pivotally attached to said second plate and said holding tube passing through said second plate passageway, whereby said first plate is moveable relative to said second plate between a first position and a second position.

20. The striking rod holder of claim 19 further comprising a cushion attached to said second plate and positioned between said first plate and said second plate, whereby when said first plate is in the first position said cushion is sandwiched between said first plate and said second plate.

21. The striking rod holder of claim 20 further comprising a locking mechanism to maintain said first plate in a fixed position relative to said second plate, said locking mechanism comprising a bracket pivotally mounted to said second plate and having a pin depending therefrom, and said first plate having a pin receiving recess whereby when said first plate is positioned to the fixed position, said bracket is pivoted so that said pin is engageable with said pin receiving recess.

22. The striking rod holder of claim 21 wherein said second plate is mounted to a boat.

23. A striking rod holder adaptor for converting a flush-mounted fixed striking rod holder having a mounting plate and a rod holding tube attached thereto into a tilting rod holder comprising:
a first member for attaching to the flush-mounted fixed striking rod holder; and
a second member for attaching to a surface, at least one of said fist member and said second member having a passageway through which said rod holding tube passes, and said first member pivotally attached to said second member.

24. The striking rod adaptor of claim 23 wherein said first member and said second member have respective passageways through which the rod holding tube can pass.

25. The striking rod holder adaptor of claim 23 further comprising a cushion attached to said second member and positioned between said first member and said second member, whereby when said striking rod holder adaptor is in a closed position, said cushion is sandwiched between said first member and said second member.

26. The striking rod holder adaptor of claim 23 comprising means for maintaining said first member in a fixed position relative to said second member.

27. The striking rod holder adaptor of claim 23 wherein the flush-mounted fixed striking rod holder mounting plate has fastener receiving holes and the first member includes holes coaxial with and corresponding to the fastener receiving holes of the mounting plate adapted to receive fasteners passing through the holes in the mounting plate attaching the mounting plate to said first member.

28. A method of converting a flush-mounted fixed rod holder into a tilting striking rod holder, where the non-tilting striking rod holder includes a mounting plate mounted to a surface and a rod holding tube attached to the mounting plate, comprising the following steps:
(a) removing the flush-mounted fixed rod holder from the surface;
(b) attaching the mounting plate to a first member of a striking rod holder adaptor, said striking rod holder adaptor further comprises a second member for attaching to a surface, said first member pivotally attached to said second member; and
(c) attaching said second member to the surface.

29. A striking rod holder comprising:

a substantially flat member having a passageway;
an elongated rod holding tube pivotally attached to said flat member and extending through said passageway and a lower end of said rod holding tube positioned below said flat member.

30. A striking rod holder of claim 29 further comprising means for maintaining said rod holding tube in a fixed position relative to said flat member.

31. A striking rod holder of claim 29 wherein an upper end of said rod holding tube is positioned above said flat member.

32. A flush-mounted striking rod holder comprising:
a first member;
a rod holding tube angularly attached to said first member, said first member having an opening therethrough for the fishing rod to be inserted into the rod holding tube; and
a second member for attaching to a surface, said second member having a passageway through which said rod holding tube passes, said first member pivotally attached to said second member.

* * * * *

UNITED STATES PATENT AND TRADEMARK OFFICE
CERTIFICATE OF CORRECTION

PATENT NO. : 5,065,540

DATED : November 19, 1991

INVENTOR(S): William S. Potter, Jr.

It is certified that error appears in the above-identified patent and that said Letters Patent is hereby corrected as shown below:

Column 3 Line 12 after "flush-mounted" insert --fixed--.

Column 3 Line 30 after "rod" insert --holder;--.

Claim 23 Line 29 Column 8 "fist" should read --first--.

Signed and Sealed this

Fifth Day of May, 1992

*Attest:*

DOUGLAS B. COMER

*Attesting Officer*  *Acting Commissioner of Patents and Trademarks*